United States Patent
Wiegert (10) Patent No.: US 7,038,458 B1
(45) Date of Patent: May 2, 2006

(54) MAGNETIC ANOMALY HOMING SYSTEM AND METHOD USING ROTATIONALLY INVARIANT SCALAR CONTRACTIONS OF MAGNETIC GRADIENT TENSORS

(75) Inventor: Roy Wiegert, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 71 days.

(21) Appl. No.: 10/964,009

(22) Filed: Oct. 12, 2004

(51) Int. Cl.
G01V 3/08 (2006.01)

(52) U.S. Cl. .................. 324/345; 324/326; 324/244
(58) Field of Classification Search ........ 324/326–329, 324/345, 244, 260; 701/1, 23, 24; 33/355 R
See application file for complete search history.

(56) References Cited

U.S. PATENT DOCUMENTS

| 6,476,610 B1 * | 11/2002 | Wiegert et al. ............. 324/345 |
| 6,714,008 B1 * | 3/2004 | Holmes et al. ............. 324/261 |
| 6,809,520 B1 * | 10/2004 | Nelson ........................ 324/329 |
| 6,841,994 B1 * | 1/2005 | Wiegert ........................ 324/244 |
| 6,865,455 B1 * | 3/2005 | Wiegert ........................ 701/23 |
| 6,888,353 B1 * | 5/2005 | Wiegert ........................ 324/345 |

FOREIGN PATENT DOCUMENTS

GB 2171523 * 8/1986

* cited by examiner

Primary Examiner—Jay M. Patidar
(74) Attorney, Agent, or Firm—James T. Shepherd (57) ABSTRACT

A magnetic anomaly homing system and method utilize an array of four triaxial magnetometer (TM) sensors coupled to a non-magnetic platform. The four TM sensors are positioned at the vertices of a rectangular parallelogram. The magnetic field sensed at the four TM sensors is processed to generate complete gradient tensors and corresponding scalar gradient contractions thereof for four two-axis gradiometers formed by the array. The scalar gradient contractions define guidance control parameters used to steer the platform toward the magnetic anomaly.

9 Claims, 3 Drawing Sheets

MAGNETIC ANOMALY HOMING SYSTEM AND METHOD USING ROTATIONALLY INVARIANT SCALAR CONTRACTIONS OF MAGNETIC GRADIENT TENSORS

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to magnetic homing systems and methods, and more particularly to a magnetic anomaly homing system and method for a mobile sensing platform that uses scalar contractions of magnetic gradient tensor data to provide guidance instructions.

BACKGROUND OF THE INVENTION

In principle, mobile magnetic sensing systems can be used by divers or robotic-type autonomous underwater sensing platforms (e.g., Autonomous Unmanned Vehicles (AUVs)) to detect and "home in on" magnetic objects such as underwater and buried mines. This requires magnetic sensing systems that will function effectively onboard highly-mobile sensing platforms such as free-swimming divers or small robotic submarines that are capable of unconstrained three-dimensional motion. Accurate identification and/or neutralization of mine-like objects often requires the sensing platform to approach very close to the object. Therefore, it is desirable that a magnetic sensing system be able to directly and efficiently guide a sensing platform toward magnetic objects or targets, i.e., "to home in on" the magnetic targets. Other potential applications for magnetic sensing systems that involve similar unconstrained three-dimensional sensing platform motion include small robotic flying craft using magnetic sensors to remotely detect and home in on magnetic objects such as land-based mines, camouflaged enemy tanks or even hidden nuclear facilities. In practice, however, the mobile magnetic sensing art has been limited by the fact that the very small magnetic signals of magnetic objects are convolved within the much larger background magnetic field of the Earth.

Magnetically polarized objects or targets such as underwater mines create characteristic DC magnetic field anomalies within the relatively constant background magnetic field of Earth. It is well-known that at distances greater than two or three times an object's linear dimensions, its magnetic signature (measured in "Tesla") approximates that of a dipole with well-defined mathematical characteristics. However, magnetic dipole field magnitudes decrease with the inverse cube of distance. Thus, at object-to-sensor distances of a few meters, a mine-like object's magnetic signature strength rapidly becomes very small (i.e., on the order of nano-Tesla or $10^{-9}$T, or even pico-Tesla or $10^{-12}$T) in comparison to the Earth's 50 micro-Tesla (or $10^{-6}$T) background field. As a result, a basic challenge for mobile magnetic sensors is the need to discriminate the very small DC target signature components that are convolved with the relatively very large field of Earth. Sensor motion in the very large Earth field can cause relatively huge, orientation-dependent changes in measured vector field components. The large, non-target-related changes in measured field components can overwhelm the relatively small target signatures and thereby reduce the sensor's effective range.

For small autonomous mobile sensing systems, size constraints require that the magnetic sensors be small and operate well with small power and computational budgets. Further, in littoral environments, target localization range can be reduced as the often turbulent, three-dimensional nature of these environments typically will cause large changes in sensor system orientation that will exceed the motion tolerance capability of conventional magnetic sensor approaches. Still further, the operational constraints that are imposed by the naval diving environment largely preclude the practical use of conventional prior art magnetic sensor systems and methods based on magnetic scalar total field or magnetic vector/gradient tensor technologies.

In order to meet the challenges of providing practical and effective magnetic target DLC capabilities for small, highly-mobile maneuverable sensing platforms, U.S. Pat. No. 6,476,610, (i.e., "the '610 patent" as it will be referred to hereinafter) teaches a novel magnetic anomaly gradient sensing system and signal processing concept. The disclosed approach is based on the use of vector triaxial magnetometers (TM) for magnetic field sensing, and the use of triaxial accelerometers for measurement of sensing platform motion and orientation.

Briefly, the '610 patent discloses a target localization approach denoted as Scalar Triangulation and Ranging (STAR). The STAR method uses simplified scalar "contractions" of partial, three-component subsets of the magnetic gradient tensor to determine relative distances to an object, i.e., "triangulate" the object's location. The symmetry properties of the gradient contraction, combined with the '610 patent's sensor array geometries, help to mitigate the adverse effects of large changes in sensor platform orientation. However, the '610 patent does not provide explicit magnetic guidance parameters that can readily be used by an autonomous vehicle to home in on magnetic mines. Further, the '610 patent discloses sensor systems and target localization methods that are too complex and inefficient for direct target-homing guidance. In addition, the partial gradient contraction subsets disclosed in the '610 patent do not provide an optimal parameter basis for homing in on targets of any orientation.

As disclosed in a subsequent related U.S. patent application Ser. No. 10/373,493, filed Feb. 19, 2003, (i.e., "the '493 application" as it will be referred to hereinafter), the symmetry properties of the gradient contraction scalars measured by each single "axis" (i.e., each set of two TMs) can be exploited to provide robotic Underwater Bottom Vehicles (UBVs) with robust two-dimensional magnetic anomaly guidance for homing in on magnetic targets. However, for a certain range of target and sensor orientations, the sensor system embodiments and gradient processing methods that are disclosed in the '493 application may not provide optimal target-homing capabilities. That is, for some sensor-target orientations, the sensor system embodiments of the '493 application may lead a vehicle on a curved path to the target rather than home straight in on the target. Still further, the sensor system embodiments and methods disclosed in the '493 application do not provide robust indications of a mine's vertical position relative to the sensing platform. That is, the '493 application does not disclose a method to explicitly determine whether a target is buried below the level of the searching platform or tethered above the searching platform.

In another related U.S. patent application Ser. No. 10/789, 481, filed Mar. 1, 2004, (i.e., "the '481 application" as it will be referred to hereinafter), an advanced multi-sensor array concept is disclosed that can be used for detection, localization and classification (DLC) of mines by autonomous swimming or flying vehicles that are capable of unconstrained three-dimensional motion. However, while the magnetic sensor systems and methods taught by the '481 application have many advantages for DLC of mines using high-mobility sensing platforms, the sensor system embodiments disclosed thereby are more complex than necessary for simple guidance of a vehicle to a magnetic target.

SUMMARY OF THE INVENTION

Accordingly, it is an object of the present invention to provide a magnetic anomaly homing system and method.

Another object of the present invention is to provide a magnetic anomaly homing system and method that generate guidance parameters which are rotationally invariant.

Other objects and advantages of the present invention will become more obvious hereinafter in the specification and drawings.

In accordance with the present invention, a magnetic anomaly homing system and method utilize a planar array of four triaxial magnetometer (TM) sensors coupled to a nonmagnetic platform. The four TM sensors are positioned at the vertices of a rectangular parallelogram that lies in a plane that is either (i) parallel to a direction of motion of the platform, or (ii) perpendicular to the platform's direction of motion. Each of the four TM sensors senses a magnetic field thereat due to the presence of a magnetic anomaly. The sensed magnetic field is defined in terms of the field's three mutually orthogonal dimensional components. The magnetic field sensed at the four TM sensors is processed to generate complete gradient tensors and corresponding scalar gradient contractions thereof for four two-axis gradiometers formed by the array. The scalar gradient contractions for each of the four two-axis gradiometers use magnetic field data associated with endpoints of two nonparallel axes of the array. The scalar gradient contractions define guidance control parameters used to steer the platform toward the magnetic anomaly.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Prior to describing the present invention, a review of magnetic phenomena relevant to the design of magnetic sensor systems will be provided. Throughout this disclosure, vector quantities are denoted by boldface type and scalar quantities by normal type. In general, the design and operation of apparatuses and methods used for detection, localization and classification (DLC) of magnetically polarized objects depend on the following:

(1) The existence of vector magnetic fields $B_A$ that emanate from the objects' net magnetization M. The $B_A$ fields constitute relatively small, short range "magnetic anomalies" within the Earth's background field.

(2) The relatively large and locally nearly constant magnetic induction field of Earth (designated as $B_E$) that permeates all space around the planetary surface. The $B_E$ field may induce much of an object's magnetic anomaly field. However, since the relatively small target anomaly field is convolved with $B_E$, the Earth's field also complicates the process of DLC of magnetic objects using mobile sensing platforms.

The vector magnetic induction field $B_A$ of a magnetically polarized object at distances r greater than about three times the object's longest dimension is given by the well known "dipole approximation", namely, $$B_A(r) = (\mu/4\pi)[3(M \bullet r)r/r^5 - M/r^3] \quad (1)$$

where $B_A(r)$ is the vector magnetic induction (in units of Tesla or "T") at a point defined by a position vector r (in units of meters or "m") relative to a vector magnetic dipole source M (in units of Amperes×meter squared or "Am$^2$"). The parameter $\mu$ is the magnetic permeability (in units of Tm/A) which is approximately equal to $4\pi \times 10^{-7}$ Tm/A for non-magnetic media.

In a Cartesian coordinate system with unit vectors i, j and k along the XYZ directions, the vectors $B_A$, r and M can be written in terms of their components or $B_A = iB_{Ax} + jB_{Ay} + kB_{Az}$, $r = iX + jY + kZ$ and $M = iM_X + jM_Y + kM_Z$. The scalar magnitudes r and M, and the product $M \bullet r$, respectively, can be written as $r = (X^2 + Y^2 + Z^2)^{0.5}$ and $M = (M_X^2 + M_Y^2 + M_Z^2)^{0.5}$, and $M \bullet r = M_X X + M_Y Y + M_Z Z$. Using these relationships, equation (1) can be written to explicitly represent the components of $B_A$ in terms of six independent scalar components (X, Y, Z and $M_X$, $M_Y$, $M_Z$) as:

$$B_{AX} = [(3X^2 - r^2)M_X + 3XYM_Y + 3XZM_Z]r^{-5} \quad (2A)$$

$$B_{AY} = [3XYM_X + (3Y^2 - r^2)M_Y + 3YZM_Z]r^{-5} \quad (2B)$$

$$B_{AZ} = [3XZM_X + 3YZM_Y + (3Z^2 - r^2)M_Z]r^{-5} \quad (2C)$$

For notational convenience, the constant ($\mu/4\pi$) has been absorbed into the dipole term M. The scalar magnitude BA is given by the square root of the sum of squares of the individual XYZ components of $B_A$ vector so that $$B_A = [(B_{AX})^2 + (B_{AY})^2 + (B_{AZ})^2]^{0.5} \quad (3)$$

Accurate DLC of magnetic objects requires the use of apparatus and methods that can measure and process $B_A$ field components at different points in order to determine both the XYZ coordinates of a target's position and the $M_X$, $M_Y$, $M_Z$, components of the target's dipole moment. However, direct measurements of $B_A$ are complicated by the relatively very large Earth field $B_E$ which has a nearly constant magnitude $B_E$ of about 50,000 nanoTesla (nT) at the Earth's surface. Equation (1) indicates that the anomaly fields that are associated with magnetic objects decrease with the inverse cube of distance to the objects, i.e., $B_A \propto r^{-3}$. Therefore, $B_E$ is generally much larger than BA except for field points that are measured very close to the target.

The Earth's field and anomaly field vectors sum to create a total field $B_T$. Therefore, direct measurements of magnetic field actually involve measurement of a total field $B_T$ that is given by $$B_T = B_E + B_A = (B_{EX} + B_{AX})i + (B_{EY} + B_{AY})j + (B_{EZ} + B_{AZ})k = \quad (4)$$
$$B_{TX} i + B_{TY} j + B_{TZ} k$$

The magnitude of $B_T$ or $B_T$ can be written as $$B_T = (B_{TX}^2 + B_{TY}^2 + B_{TZ}^2)^{0.5} \quad (5)$$

The quantity $B_T$ is a rotationally invariant scalar. Unfortunately, $B_T$ is not a robust quantity. That is, $B_T$ does not always increase as the sensor-target distance, r decreases. Consequently, $B_T$ does not provide a good basis for target localization. Unlike the quantity $B_A$, $B_T$ isn't robust because, at a given sensor-target distance in some regions in target space, the $B_E$ and $B_A$ fields point in the same direction and thereby increase the magnitude of $B_T$. However, in other regions, the $B_E$ and $B_A$ fields point in opposite directions thereby decreasing the magnitude of $B_T$.

To use $B_A$ to detect and "home in on" or localize magnetic objects from high-mobility sensing platforms, apparatus and methods are required that can detect and discriminate relatively small target signatures $B_A$ that are convolved with the Earth's field $B_E$ and efficiently extract the target position from the $B_A$ signature measurements. The detection/discrimination of $B_A$ usually requires sensor systems that can measure the spatial rate of change or gradient of $B_T$.

In the absence of field anomalies caused by magnetic objects, $B_E$ constitutes a fairly uniform background field. Typically, the variation of $B_E$ with distance, i.e., the gradient of $B_E$ or $\nabla B_E$ is approximately 0.02 nT/meter. (The gradient operator is defined by $\nabla = i\partial/\partial x + j\partial/\partial y + k\partial/\partial z$.) Therefore, the effects of $B_E$ can be much reduced by developing sensors that measure the gradient of $B_T$.

Mathematically, $\nabla B_T = \nabla(B_E + B_A) = \nabla B_E + \nabla B_A \approx 0.02$ nT/m + $\nabla B_A \approx \nabla B_A$ so measurement of the gradient of $B_T$ essentially yields the gradient of $B_A$.

The first order gradient $\nabla B_A$ (where $|\nabla B_A(r)| \propto r^{-4}$) of the vector field of equation (1) is a second rank tensor having matrix elements given by the following expression $$(\overline{VB})_{ij} \equiv G_{ij} \equiv \partial B_i / \partial r_j = \quad (6)$$
$$-3[Mor(5r_ir_j - r^2\delta_{ij}) - r^2(r_iM_j + r_jM_i)]r^{-7} =$$
$$-3[(M_xX + M_YY + M_ZZ)(5r_ir_j - r^2\delta_{ij}) - r^2(r_iM_j + r_jM_i)]r^{-7}$$

Note that in equation (6) and in the remainder of the description, the quantity/vector B/B will appear without the use of the subscript "A" (for an anomaly field) in order to simplify recitation of the equations. Thus, it is to be understood that a recitation of B or B represents a general magnetic induction field that may include a magnetic anomaly. The $r_i$ terms refer to the X,Y,Z Cartesian coordinates at the measuring point ($r_1 \equiv X$, $r_2 \equiv Y$, $r_3 \equiv Z$). The $\delta_{ij}$ factor is 1 if i equals j, and the $\delta_{ij}$ factor is 0 if i does not equal j. Writing the equation for $G_{ij}$ in matrix form yields $$\begin{matrix} & (X) & (Y) & (Z) \\ & G_{xx} & G_{xy} & G_{xz} \\ & G_{yx} & G_{yy} & G_{yz} \\ & G_{zx} & G_{zy} & G_{zz} \end{matrix} = \begin{matrix} (X) & (Y) & (Z) \\ \partial B_x/\partial x & \partial B_x/\partial y & \partial B_x/\partial z \\ \partial B_y/\partial x & \partial B_y/\partial y & \partial B_y/\partial z \\ \partial B_z/\partial x & \partial B_z/\partial y & \partial B_z/\partial z \end{matrix}$$

$$\approx \begin{matrix} (X) & (Y) & (Z) \\ \Delta B_x/\Delta x & \Delta B_x/\Delta y & \Delta B_x/\Delta z \\ \Delta B_y/\Delta x & \Delta B_y/\Delta y & \Delta B_y/\Delta z \\ \Delta B_z/\Delta x & \Delta B_z/\Delta y & \Delta B_z/\Delta z \end{matrix}$$

Each (X), (Y) and (Z) column of the matrix represents the rate of change of the components of B along a particular X, Y or Z direction (or "axis") in space.

Some simplification of the magnetic gradient tensor occurs as a result of Maxwell's Equations for the divergence and curl of B, namely, $\nabla \bullet B = 0$ and $\nabla \times B = 0$.

Consequently, the gradient tensor matrix is both "traceless" and "symmetric." Here, "traceless" means that the sum of matrix elements on the principal diagonal of the matrix is zero, while "symmetric" means that matrix elements across the diagonal are equal. Note that because of the traceless and symmetric features of the gradient tensor matrix, measurement of five independent tensor components can be used to completely determine the full, nine component gradient tensor. This invention develops a novel application of these symmetry features of the magnetic gradient in combination with sensor embodiments of appropriate symmetries to determine a plurality of spatially separate, full gradient tensors and their "contractions."

With regard to the actual measurement process, the finite difference elements, $\Delta B_x/\Delta x$, $\Delta B_x/\Delta y$, $\Delta B_x/\Delta z$, etc., approximate the mathematical gradient components $\partial B_x/\delta x$, $\partial B_x/\partial y$, $\partial B_x/\partial z$, etc., as vector field components are (i) measured at spatially separated points along the XYZ axes, (ii) the field values at one point are subtracted from the values at another, and (iii) the resultant differential field values are divided by the directed distances $\Delta X$, $\Delta Y$ and $\Delta Z$ between the points. The resulting quantity represents the average gradient at the midpoint of the respective distance $\Delta X$, $\Delta Y$ or $\Delta Z$.

Just as the magnitude of a vector is given by the square root of the sum of the "contracted" (i.e., squared) vector components, the magnitude of a gradient tensor is given by the square root of the sum of contracted tensor components. In Cartesian (XYZ) coordinates, the total gradient contraction $C_T^2$ (i.e., a scalar quantity) of the magnetic gradient tensor G can be represented by the following expression.

$$C_T^2 = \sum (G_{ij})^2 = G_{xx}^2 + G_{xy}^2 + \cdots \quad (7)$$
$$= (\partial B_x/\partial x)^2 + (\partial B_x/\partial y)^2 + (\partial B_x/\partial z)^2 +$$
$$(\partial B_y/\partial x)^2 + (\partial B_y/\partial y)^2 + (\partial B_y/\partial z)^2 +$$
$$(\partial B_z/\partial x)^2 + (\partial B_z/\partial y)^2 + (\partial B_z/\partial z)^2$$
$$\approx (\Delta B_x/\Delta x)^2 + (\Delta B_x/\Delta y)^2 + (\Delta B_x/\Delta z)^2 +$$
$$(\Delta B_y/\Delta x)^2 + (\Delta B_y/\Delta y)^2 + (\Delta B_y/\Delta z)^2 +$$
$$(\Delta B_z/\Delta x)^2 + (\Delta B_z/\Delta y)^2 + (\Delta B_z/\Delta z)^2$$

The gradient contraction $C_T^2$ (as well as the square root thereof resulting in what will be referred to hereinafter as the "$C_T$ parameter") of the full, nine component magnetic gradient tensor is a rotationally invariant and robust scalar that does not change with changes in sensing platform orientation. In order to obtain all nine components of the gradient tensor, at least five independent tensor components must be measured. For the present invention, this is done using data from at least two nonparallel axes of a magnetic sensor array.

The present invention uses a plurality of $C_T$ parameters to provide a more robust and efficient target homing capability. In contrast, prior art methods use partial gradient contractions C (i.e., the sum of squares of three tensor components) which are affected by changes in sensor platform orientation. Specifically, at a given point in space, the value of a partial gradient contraction C is dependent on the following three factors related to the distance and angular orientation of the measurement axis relative to the target position and the magnetic anomaly field $B_A$:

1) At a given point in the far field space, the magnitude of the partial gradient contraction C measured by a single-axis gradiometer is proportional to the inverse fourth power of the distance r between the center of the axis and the target, that is, $C \propto r^{-4}$.

2) The magnitude of the partial gradient contraction C that is measured by a given axis is a monotonic function of the magnitude of the projection of the measurement axis length d in the direction of r, that is, $C \propto [K_\theta + d|\cos\theta|]$ where $\theta$ is the relative angle between the directions of d and r, and $K_\theta$ is a positive non-zero parameter included to account for the fact that C doesn't go to zero when cosine $\theta = 0$.

3) The magnitude of the partial gradient contraction C that is measured by a given axis is a function of the projection of d in a direction perpendicular to the local anomaly field $B_A$ direction, that is, $C \propto [K_\phi + d|\sin\phi|]$ where $\phi$ is the relative angle between d and $B_A$, and $K_\phi$ is a positive non-zero parameter.

The sensor system embodiments and methods of the present invention are designed to enhance the efficiency of magnetic anomaly homing by using a better, more symmetric sensor system design concept that intrinsically compensates for the effects of the third factor of the aforementioned dependencies of C. Likewise, the present invention provides an enhanced general target-homing capability by developing and use of rotationally invariant $C_T$ parameters that are essentially immune to the effects of sensor-target orientation.

The present invention's system and method processes scalar $C_T$ parameters to directly home in on magnetic targets. The $C_T$ parameters can be derived from field measurements collected by planar arrays of triaxial magnetometer (TM) sensors that measure XYZ vector components of the vector total field $B_T$. As is known in the art, a TM sensor has three mutually orthogonal magnetic field sensing axes for sensing magnetic field (i.e., B-field) components ($B_x$, $B_y$, $B_z$). The sense axis directions define a convenient and computationally efficient choice for a local (X,Y,Z) coordinate system. The design and construction requirements for TM sensors used in the present invention are as follows:

Provide a signal output that responds to the vector component of magnetic field along a single direction in space (i.e., the sensitive axis) and not respond to field components that are orthogonal to the sensitive axis.

Have a frequency response from DC to frequencies high enough to include the entire sensor-motion-induced frequency spectrum contained in a target's induction field.

Have sufficient sensitivity and dynamic range to effectively detect and discriminate small anomaly fields in the large background field of the earth.

Be of small physical size to allow a triad of sensors to be mutually configured in very close proximity as a triaxial array with orthogonal sense axes.

Be easily and accurately compensated for the individual differences between the sensor channels' gain and alignment in the sensor system reference frame.

Present day vector magnetometer technology and recent advances in micro-electromechanical systems (MEMS) technology allows these criteria to be fulfilled by a variety of sense elements such as triaxial fluxgate magnetometers, giant magnetoresistive devices, giant magnetoimpedance devices, superconducting quantum interference (SQUID) devices and enhanced sensitivity Hall effect devices.

Figure 1:
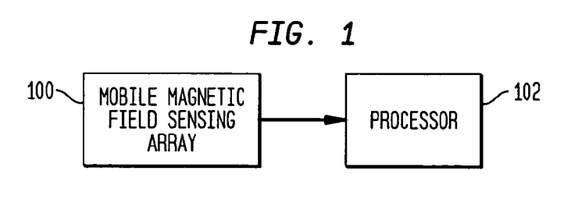
FIG. 1 is a top-level block diagram of a magnetic anomaly homing system in accordance with the present invention.

FIG. 1 is a top-level block diagram illustrating the basic system components required to carry out the homing method of the present invention. The first component is a mobile magnetic field sensing array 100 of TM sensors, each of which is capable of detecting the XYZ vector components of vector total field $B_T$. The sensed magnetic data is provided to a processor 102 that uses same to develop guidance instructions or control information. For example, if array 100 is mounted on a manually-driven vehicle, the output of processor 102 serves as navigation instructions for the vehicle's operator. For an autonomously-driven vehicle, the output of processor 102 serves as the control signals used by the vehicle's navigation system. Accordingly, it is to be understood that the goal of the present invention's system and method is to provide guidance control parameters which can be used in a variety of non-limiting ways (e.g., by a vehicle operator, by a variety of autonomous navigation systems, etc.) to steer a platform towards a detected magnetic anomaly.

Figure 2:
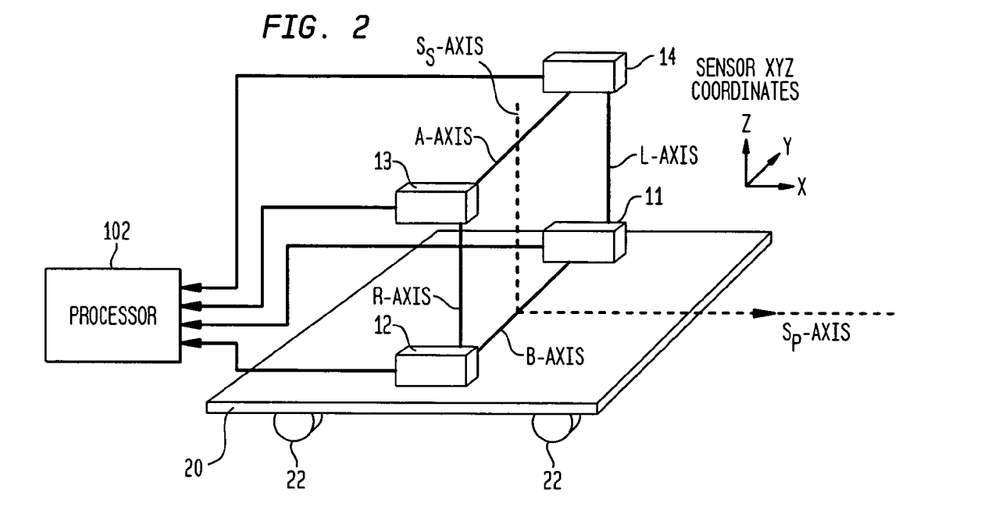
FIG. 2 is a schematic view of a vertical array of four magnetic sensors in accordance with an embodiment of the present invention.

Referring now to FIG. 2, one embodiment of the present invention is illustrated. A planar four TM sensor array is mounted vertically on a rigid, non-magnetic platform 20 having the means to make platform 20 mobile. For example, platform 20 could be mounted on (motorized) wheels 22, or any other means for making platform 20 mobile (e.g., tracks, legs, fluid propulsion system, etc.) on a surface or freely swimming in a fluid environment. The type of system used to make platform 20 mobile is not a limitation of the present invention. Furthermore, it is to be understood that platform 20 is representative of either (i) a vehicle that is manually steered by an operator located on or at a remote location with respect to platform 20, or (ii) a vehicle that is autonomously steered by means of an onboard navigation control system.

The geometry of the four TM sensor array is designed to exploit the symmetry properties of two types of gradient contraction-based guidance parameters, namely (i) total gradient guidance parameters (i.e., $C_T$ parameters), and (ii) partial gradient contraction-type guidance parameters (i.e., C parameters). In general, the $C_T$ parameters are rotationally invariant parameters that facilitate homing guidance regardless of sensor platform orientation. Thus, the remainder of the description will focus primarily on $C_T$ parameter development and usage in a homing scenario. However, it is to be understood that the $C_T$ and C parameters could be used in a complementary guidance modality.

The vertical configuration illustrated in FIG. 2 provides readily interpreted left-right guidance signals for applications where, in the case of a sensor platform that moves along the sea bottom or on land, the targets of interest are on the surface or buried below the surface. The FIG. 2 configuration is also useful when platform 20 is representative of a freely swimming or flying vehicle in which case a magnetic target could be above or below the vehicle.

TM sensors 11–14 are positioned at the vertices of a rectangle with the sensors' XYZ axes being mutually parallel and in parallel with the overall system XYZ coordinates. For optimum symmetry, sensors 11–14 are placed at the vertices of a square. The plane of the array is perpendicular to the horizontal XY plane and to the $S_P$ axis of sensor platform 20. The vertical axis of symmetry (Ss) in the plane of the sensor array is perpendicular to the sensor platform's axis of symmetry ($S_P$). For development of partial gradient (i.e., C-type target homing signals), sensors 11 and 14 comprise the array's left primary guidance axis or L-Axis, and sensors 12 and 13 comprise the right primary guidance axis or R-Axis. The symmetries of the rectangular array embodiment ensures that the R-Axis and L-Axis are of equal length and parallel to one another. In this embodiment, the length of R-Axis and L-Axis equals ΔZ. Sensors 11 and 12 comprise the B-Axis at the bottom of the array, while sensors 13 and 14 comprise the A-Axis at the top of the array. The lengths of the A-Axis and B-Axis are equal to ΔY. The Ss-axis divides the rectangle into two congruent parts and perpendicularly bisects the A-Axis and B-Axis. The output from each of sensors 11–14 is provided to processor 102. Processor 102 uses the sensor outputs to develop the magnetic target detection and homing signals.

Figure 3:
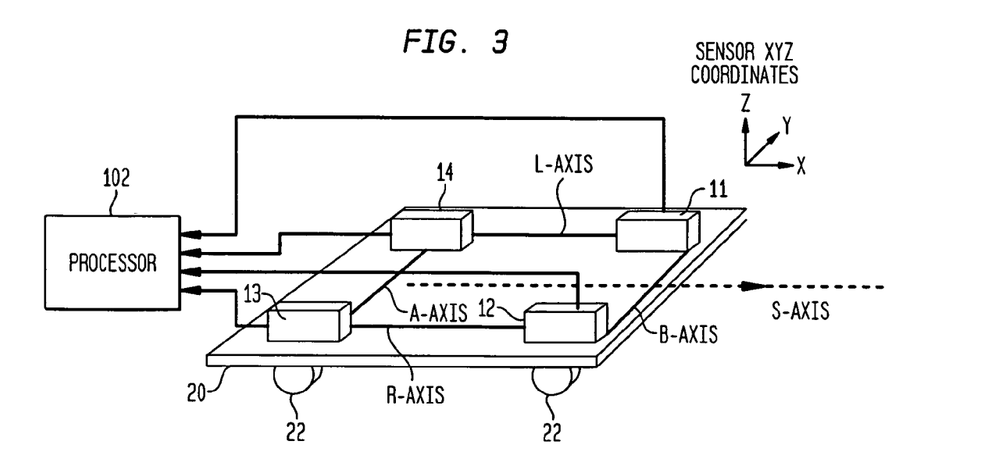
FIG. 3 is a schematic view of a horizontal array of four magnetic sensors in accordance with another embodiment of the present invention.

Referring now to FIG. 3, a horizontally-oriented four TM sensor array is illustrated with, once again, the positions of the four sensors preferably defining a rectangular parallelogram. Sensors 11–14 are mounted with their respective XYZ axes mutually in parallel and in parallel with the system XYZ coordinates. The sensors on the right and left sides of the parallelogram respectively constitute the R-Axis and L-Axis that are parallel, of equal length, and symmetrically situated about the central symmetry axis or S-Axis. The secondary guidance axes, i.e., B-Axis and A-Axis, are respectively situated fore and aft on sensor platform 20 and are perpendicular to the S-Axis. In terms of using partial gradient type guidance parameters (i.e., C parameters), this embodiment provides advantages when the sensor system will ride on a surface on which the magnetic targets reside. That is, a stronger signal response can be expected in this situation (as compared with the embodiment illustrated in FIG. 2) because the primary guidance axes (i.e., R-Axis and L-Axis) are essentially pointing towards the targets as platform 20 moves towards them. The output from each of sensors 11–14 is provided to processor 102.

The process for development of the rotationally invariant $C_T$ parameters is the same for each of the embodiments shown in FIGS. 2 and 3. Accordingly, a description of the development of the $C_T$ parameters for the FIG. 2 embodiment will suffice for the FIG. 3 embodiment. The development of the $C_T$ parameters in accordance with one construction method will now be explained with the aid of FIGS. 4A–4D. A second $C_T$ parameter construction method will also be provided and discussed with the aid of FIGS. 5A–5D.

Referring first to FIGS. 4A–4D, sensors 11–14 are shown in a plan view with the solid lines being used to illustrate the relationship between three sensors that form a two-axis three-sensor gradiometer in each of FIGS. 4A–4D. Specifically, FIGS. 4A–4D illustrate four spatially separate, two-axis three-sensor gradiometers that can be formed from the four sensor array embodiments of FIGS. 2 and 3. Each of the three-sensor gradiometers defined in FIGS. 4A–4D is formed by sensors located at the endpoints of two nonparallel axes on the peripheral edges of the sensor array. The gradiometers are used to develop sets of nine-component gradient tensors ($G_{Ti}$) and their $C_{Ti}$ parameters.

The development of sets of total $G_{Ti}$'s and $C_{Ti}$'S for the above combinations of sensors follows the method described in the above-cited U.S. patent application Ser. No. 10/789,481, filed Mar. 1, 2004, the contents of which are hereby incorporated by reference. Briefly, the construction of a complete gradient tensor $G_{Ti}$ and its contraction $C_{Ti}$ consists of the following steps:

Step 1: Measurement of XYZ components of B by each sensor.

Step 2: Direct construction of at least five independent gradient components of $G_T$ from the sensor measurements.

Step 3: "Indirect" construction of the gradient components of $G_T$ that were not determined in Step 2. This process exploits the symmetry properties of the gradient tensor.

Step 4: Combination of results of Steps 2 and 3 to form a complete nine-tensor-component gradient tensor $G_{Ti}$.

Step 5: Contraction (taking the sum of squares) of the nine tensor components of $G_T$ to form the rotationally invariant scalar $C_{Ti}$ parameter.

Figure 4A:
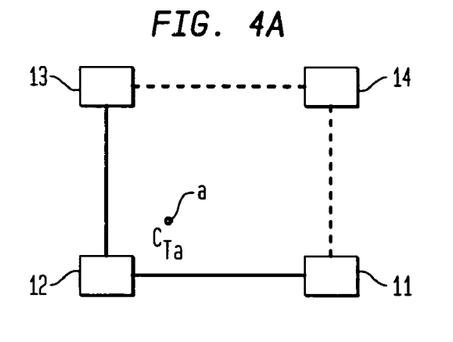
FIG. 4A is a plan view of four sensors with three sensors thereof forming a three-sensor gradiometer used to develop a first $C_T$ parameter.
Figure 4B:
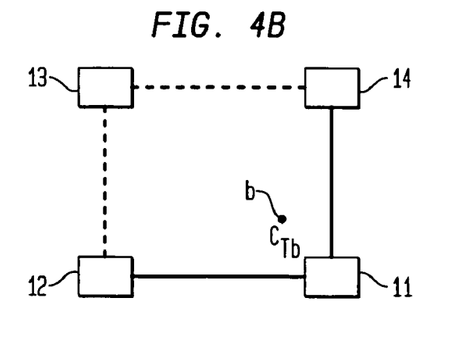
FIG. 4B is a plan view of four sensors with three sensors thereof forming a three-sensor gradiometer used to develop a second $C_T$ parameter.
Figure 4C:
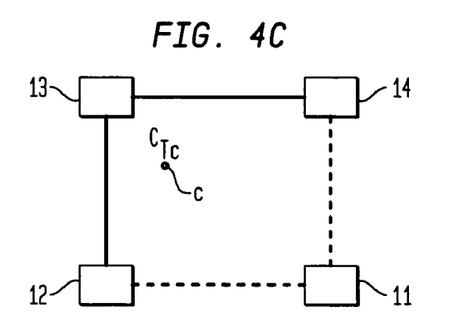
FIG. 4C is a plan view of four sensors with three sensors thereof forming a three-sensor gradiometer used to develop a third $C_T$ parameter.
Figure 4D:
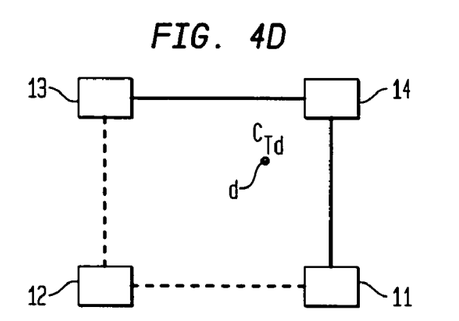
FIG. 4D is a plan view of four sensors with three sensors thereof forming a three-sensor gradiometer used to develop a fourth $C_T$ parameter.
Figure 5A:
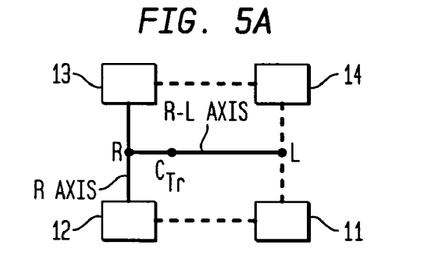
FIG. 5A is a plan view of four sensors in which one real gradiometer axis and one virtual gradiometer axis are used to develop a first $C_T$ parameter.
Figure 5B:
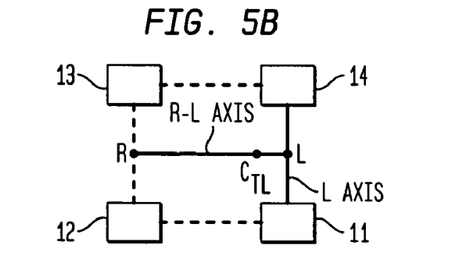
FIG. 5B is a plan view of four sensors in which one real gradiometer axis and one virtual gradiometer axis are used to develop a second $C_T$ parameter.
Figure 5C:
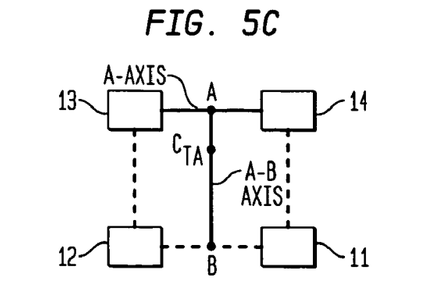
FIG. 5C is a plan view of four sensors in which one real gradiometer axis and one virtual gradiometer axis are used to develop a third $C_T$ parameter.
Figure 5D:
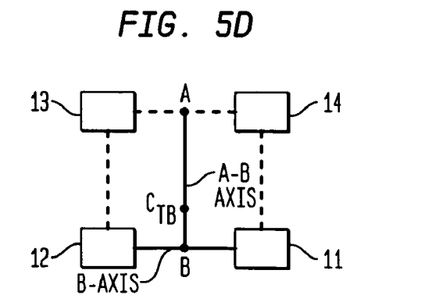
FIG. 5D is a plan view of four sensors in which one real gradiometer axis and one virtual gradiometer axis are used to develop a fourth $C_T$ parameter.

By way of illustration, the above steps will be explicitly performed for the gradiometer configuration of FIG. 4A. The main part of the process involves development of the complete gradient tensor, namely, $$G_T = \begin{pmatrix} \partial B_x/\partial x & \partial B_x/\partial y & \partial B_x/\partial z \\ \partial B_y/\partial x & \partial B_y/\partial y & \partial B_y/\partial z \\ \partial B_z/\partial x & \partial B_z/\partial y & \partial B_z/\partial z \end{pmatrix} \approx \begin{pmatrix} \Delta B_x/\Delta x & \Delta B_x/\Delta y & \Delta B_x/\Delta z \\ \Delta B_y/\Delta x & \Delta B_y/\Delta y & \Delta B_y/\Delta z \\ \Delta B_z/\Delta x & \Delta B_z/\Delta y & \Delta B_z/\Delta z \end{pmatrix}$$

Step 1 specifically acquires the data set: $B_{x1}$, $B_{y1}$, $B_{z1}$, $B_{X2}$, $B_{Y2}$, $B_{Z2}$, $B_{X3}$, $B_{Y3}$, $B_{Z3}$ where the numbers 1, 2, 3 indicate the measurement sensor, i.e., $B_{X1}$ is the X-component of magnetic field measured by sensor 11, etc.

Step 2 involves calculation of the gradient components between sensors 11 and 12 (separated by ΔY) and between sensors 12 and 13 (separated by ΔZ). Six gradient components can be obtained from directly measured combinations, namely, $(\partial B_x/\partial y)_{2,1} \approx \Delta B_x/\Delta y$ $= (B_{x1} - B_{x2})/\Delta Y$ (by symmetry across the diagonal $= \Delta B_y/\Delta x)$ $(\partial B_y/\partial y)_{1,2} \approx \Delta B_y/\Delta y$ $= (B_{Y1} - B_{Y2})/\Delta Y$ $(\partial B_z/\partial y)_{1,2} \approx \Delta B_z/\Delta y$ $= (B_{z1} - B_{z2})/\Delta Y$ (by symmetry across the diagonal $= \Delta B_y/\Delta z)$ $(\partial B_x/\partial z)_{3,2} \approx \Delta B_x/\Delta z$ $= (B_{x3} - B_{x2})/\Delta Z$ (by symmetry across the diagonal $= \Delta B_z/\Delta x)$ $(\partial B_y/\partial z)_{3,2} \approx \Delta B_y/\Delta y$ $= (B_{Y3} - B_{Y2})/\Delta Z$ $(\partial B_z/\partial z)_{3,2} \approx (B_{z3} - B_{z2})/\Delta Z$ Step 3 invokes the symmetry properties of the gradient tensor to get the three gradient components in the X-direction that could not be directly measured by the sensor array. The three required components are $\Delta B_x/\Delta x$, $\Delta B_y/\Delta x$ and $\Delta B_z/\Delta x$. The component $\Delta B_x/\Delta x$ is obtained from the "traceless" property of the gradient and the components $\Delta B_y/\Delta x$ and $\Delta B_z/\Delta x$ are obtained from the "symmetrical across the diagonal" property of the gradient tensor. That is, $\Delta B_x/\Delta x + \Delta B_y/\Delta y + \Delta B_z/\Delta z = 0$, therefore, $\Delta B_x/\Delta x = -(\Delta B_y/\Delta y + \Delta B_z/\Delta z)$
$= -((B_{Y1} - B_{Y2})/\Delta Y + (B_{Z3} - B_{Z2})/\Delta Z))$
$\Delta B_y/\Delta x = \Delta B_x/\Delta y$
$= (B_{x1} - B_{x2})/\Delta Y$ and $\Delta B_z/\Delta x$, and
$\Delta B_x/\Delta Z = (B_{x3} - B_{x2})/\Delta Z$ As a result, the nine-component gradient tensor $G_{Ta}$ is $-[(B_{Y1} - B_{Y2})/\Delta Y + (B_{Z3} - B_{Z2})/\Delta Z]\ (B_{X1} - B_{X2})/\Delta Y\ (B_{X3} - B_{X2})/\Delta Z$
$(B_{X1} - B_{X2})/\Delta Y\ (B_{Y1} - B_{Y2})/\Delta Y\ (B_{Y3} - B_{Y2})/\Delta Z$
$(B_{X3} - B_{X2})/\Delta Z\ (B_{Z1} - B_{Z2})/\Delta Y\ (B_{Z3} - B_{Z2})/\Delta Z$ The corresponding gradient contraction parameter $C_{Ta}$ for the point "a" of the gradiometer subset comprised by sensors 11, 12 and 13 is the square root of the sum of squares of the matrix elements of $G_{Ta}$ from the preceding steps. In particular, $C_{Ta}$ corresponds to primary guidance point "a" of the gradiometer illustrated by FIG. 4A. From the description given for the gradiometer subset of illustrated by FIG. 4A, the construction of nine component tensors and their corresponding gradient contraction $C_T$ parameters for the points "b", "c" and "d" associated with the gradiometer subsets illustrated in FIGS. 4B–4D, respectively, follows in a similar fashion. For this configuration, the $C_T$ parameters for points "a" and "b" (i.e., $C_{Ta}$ and $C_{Td}$) comprise a lower set of right-left guidance parameters, while the $C_T$ parameters for points "c" and "d" (i.e., $C_{Tc}$ and $C_{Td}$) comprise an upper set of right-left guidance parameters. The relative magnitudes of the upper and lower sets of points indicate the proximity of the target relative to the respective points in the sensing system. For example, if $C_{Tc}$, $C_{Td}$>$C_{Ta}$, $C_{Tb}$, then the vertical position of the target is above the sensor platform.

Another set of total gradient type primary guidance parameters can be constructed from the rectangular sensor embodiments shown in FIGS. 2 and 3. For this construction, different combinations of data from all four sensors are used to form the four spatially separate two-axis gradiometers schematically shown in FIGS. 5A–5D. A complete nine component gradient tensor is constructed for each two-axis gradiometer and contraction of each tensor results in the symmetrically situated sets of $C_T$ parameters, namely, $C_{TR}$, $C_{TL}$, $C_{TA}$ and $C_{TB}$. The $C_{TR}$ and $C_{TL}$ parameters provide robust, rotationally invariant right and left guidance for controlling the azimuth of an autonomous vehicle (or can be used by an operator of a manually-driven vehicle) as it homes in on magnetic target. Likewise, parameters $C_{TA}$ and $C_{TB}$ can be used to indicate proximity of a target relative to the parameter's effective points of operation. For example, for the vertically arranged sensor embodiment of FIG. 2, $C_{TA}$ and $C_{TB}$ constitute robust, rotationally invariant parameters for determining the vertical position of a target relative to the sensor platform. Furthermore, if the sensor platform is capable of three-dimensional motion, the $C_{TA}$ and $C_{TB}$ parameters can provide guidance for controlling the pitch of an autonomous vehicle as it homes in on a target. Also, the sum $C_{TT}=C_{TR}+C_{TL}+C_{TA}+C_{TB}$ provides a robust target detection and proximity-sensing capability.

In FIGS. 5A–5D, the nonparallel gradiometer axes being utilized are once again indicated by solid lines. For each of the four gradiometers depicted in FIGS. 5A–5D, one of the two required axes is defined by a real peripheral or edge axis (i.e., the R, L, A and B-axes are real axes that respectively are comprised by sensors 12/13, 11/14, 13/14 and 11/12). However, the second axis in each two-axis gradiometer uses one of the "virtual" "R-L Axis" or "A-B Axis". These axes are "virtual" in the sense that there are no sensors physically located at their endpoints. Rather, the endpoints of the virtual axes are at the midpoints of opposing pairs of the real axes. Thus, the R-L Axis and A-B Axis define axes that bisect the sensor array.

Gradient data from the R, L, A and B axes are collected in the usual way. Gradient data from the R-L and A-B virtual axes are determined as follows:

(i) XYZ components of the magnetic field at points R, L, A and B are computed by taking the arithmetic average of the field readings of sensors 12/13, 11/14, 13/14 and 11/12, respectively. For example, the average field at point R (located halfway between sensors 12 and 13) is equal to one-half of the sum of the field at sensor 12 plus the field at sensor 13. Thus, $B_{XR} = (B_{X2} + B_{X3})/2$, $B_{YR} = (B_{Y2} + B_{Y3})/2$, $B_{ZR} = (B_{Z2} + B_{Z3})/2$, and $B_{XL} = (B_{X1} + B_{X4})/2$, $B_{YL} = (B_{Y1} + B_{Y4})/2$, $B_{ZL} = (B_{Z1} + B_{Z4})/2$.

(ii) Gradients along the R-L axis are computed by subtracting average field components at point L (located halfway between sensors 11 and 14) from the respective field values at point R. Likewise, gradients along the A-B axis are calculated by subtracting average field values at point A (located halfway between sensors 13 and 14) from the respective values at point B (located halfway between sensors 11 and 12). For example, $(\Delta B_X/\Delta Y)_{L\text{-}R}=(B_{XL}-B_{XR})/\Delta Y$, etc. Here $\Delta Y$ is the length of the R-L axis which is equal to the distance between sensors 11 and 12.

Proceeding in this way, measured components from the two axes fill out six of the nine components of the gradient tensor. The three remaining components are computed, in a manner similar to that described above with the aid of FIGS. 4A–4D, from the symmetry properties of the gradient tensor. After each complete gradient tensor is computed, the $C_{TR}$ and $C_{TL}$ parameters (and the $C_{TA}$ and $C_{TB}$ parameters) are readily computed from the sum of squares of gradient tensor components.

Figure 6:
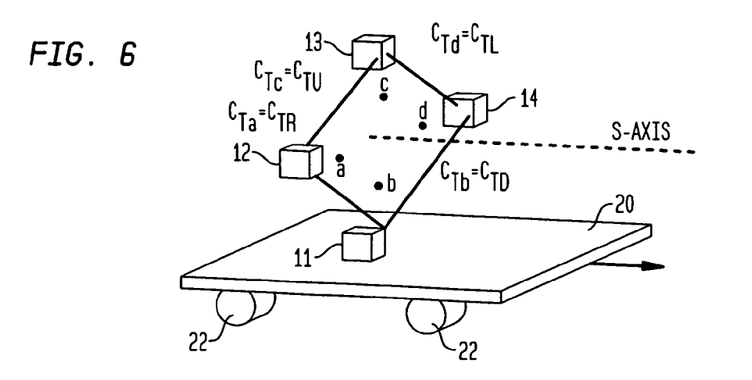
FIG. 6 is a schematic view of a vertical array of four magnetic sensors in accordance with another embodiment of the present invention.

FIG. 6 illustrates yet another embodiment of a vertical sensor array that is obtained by rotating the embodiment of FIG. 2 through an angle of 45° about a horizontal axis parallel to the S-Axis and passing through sensor 11. The $C_T$ parameters for points "a", "b", "c" and "d" are developed using the two-axis method described above. Here, $C_{Ta}$ and $C_{Td}$ explicitly correspond to the right ($C_{TR}$) and left ($C_{TL}$) guidance parameters, respectively, while $C_{Tc}$ and $C_{Tb}$ correspond to the up ($C_{TU}$) and down ($C_{TD}$) guidance parameters, respectively.

Figure 7:
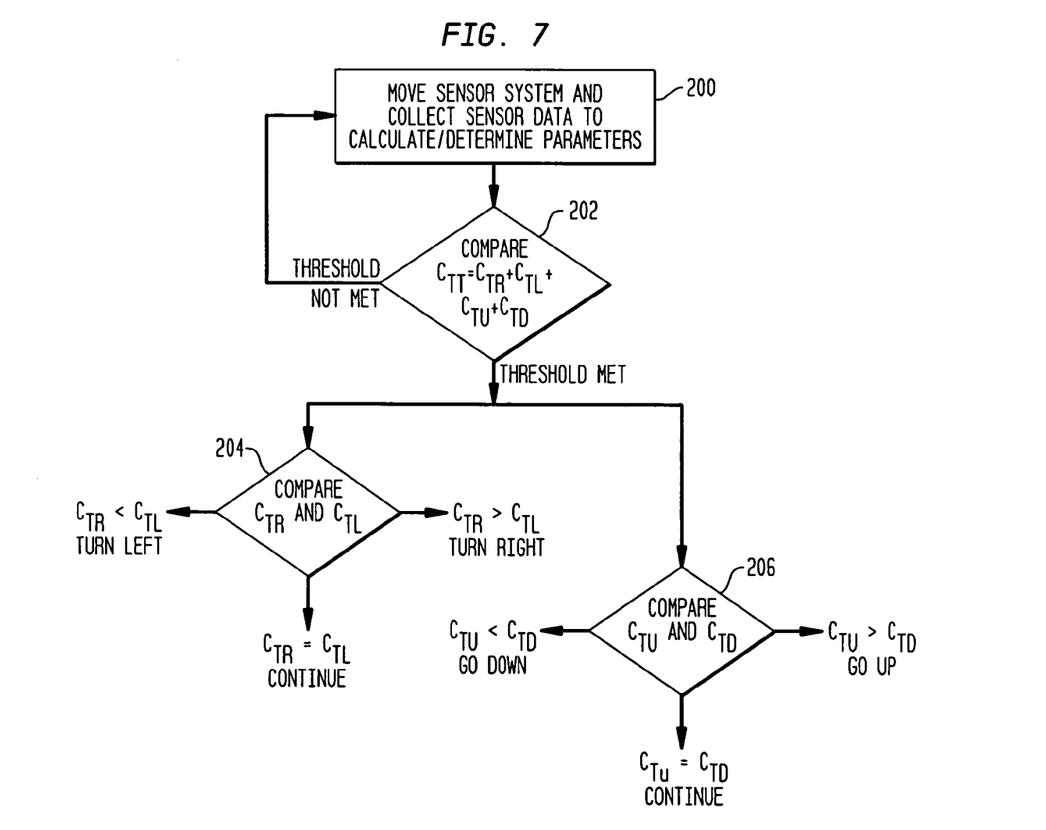
FIG. 7 is a flow diagram illustrating the steps for using the developed $C_T$ parameters to home in on a magnetic target in accordance with the present invention.

Regardless of the construction used to generate the $C_T$ parameters, the process of using same to home in on a magnetic target is the same as will now be explained with the aid of the flow diagram illustrated in FIG. 7. In FIG. 7, the homing process using scalar $C_T$ parameters in accordance with the present invention will now be described by way of example for the sensor system illustrated in FIG. 6. At step 200, the sensor system is moved (i.e., manually or autonomously) in an area and the above-defined $C_T$ parameters are calculated/determined using the data collected by sensors 11–14. The $C_T$ parameters are summed to form a total $C_{TT}$ that is compared to a pre-determined threshold value at step 202. If the threshold is not met (i.e., no magnetic target is detected), processing returns to step 200 where the sensor system continues to move and search. If the threshold is met (i.e., a magnetic target is detected), step 204 compares the primary guidance $C_T$ parameters for azimuth where $C_{TR}=C_{TL}$ indicates that the sensor array (moving in the direction of the S-Axis) is heading toward the azimuthal position of the magnetic target, $C_{TR}>C_{TL}$ indicates that the sensor array should be turned to the right until $C_{TR}=C_{TL}$ in order to head toward the target, and $C_{TR}<C_{TL}$ indicates that the sensor array should be turned to the left until $C_{TR}=C_{TL}$ in order to head toward the target.

At the same time, step 206 compares the primary guidance $C_T$ parameters for elevation $C_{TU}$ and $C_{TD}$ where $C_{TU}=C_{TD}$ indicates that the sensor array is aligned vertically with the magnetic target, $C_{TU}>C_{TD}$ indicates that the vertical position of the target is above the sensor array and the array should angle upward or move up relative to the S-Axis, and $C_{TU}<C_{TD}$ indicates that the sensor array should angle downward or move down relative to the S-Axis.

The above-described homing process continues until contact with the target is made or a predetermined "target located" threshold of a guidance parameter is achieved.

The advantages of the present invention are numerous. The method and systems described herein provide a uniquely robust and efficient form of magnetic anomaly detection and homing. The magnetic homing systems and method of this invention can be used by robotic vehicles for detection and localization of ferrous objects such as underwater and buried mines. In practical use, a human operator or robotic vehicle would move the sensor in a search pattern that scans for magnetic targets. When a target is within the sensor's detection range, target detection and guidance signals are generated that indicate the direction of the target relative to the sensor system. The guidance signals can then be used to home in on the magnetic target. The embodiments of the invention can be used to provide two or three-dimensional magnetic guidance for autonomous vehicles moving on land or crawling/swimming underwater. This sensor concept is applicable to a wide variety of commercial and military uses where improved and practical magnetic guidance capabilities can be used to precisely localize and contact magnetic targets. The following list includes some important applications:

Mine countermeasure applications involving the detection, localization and classification of magnetic mines on land or underwater.

Localization and tracing of subterranean pipes and cables.

Localization of military targets, e.g., tanks by providing magnetic guidance to small, unmanned robotic vehicles.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed is:

1. A magnetic anomaly homing system, comprising:
a non-magnetic platform;
a planar array of four triaxial magnetometer (TM) sensors coupled to said platform, said four TM sensors positioned at the vertices of a rectangular parallelogram lying in a plane that is one of (i) parallel to a direction of motion of said platform and (ii) perpendicular to said direction of motion, each of said four TM sensors sensing a magnetic field thereat due to the presence of a magnetic anomaly, said magnetic field being sensed in terms of three mutually orthogonal dimensional components thereof; and
processing means coupled to each of said four TM sensors for using said magnetic field so-sensed at each of said four TM sensors to generate complete gradient tensors and corresponding scalar gradient contractions thereof for four two-axis gradiometers formed by said array, wherein said scalar gradient contractions for each of said four two-axis gradiometers use magnetic field data associated with endpoints of two nonparallel axes of said array, and wherein said scalar gradient contractions define guidance control parameters used to steer said platform toward the magnetic anomaly.

2. A magnetic anomaly homing system as in claim 1 wherein said rectangular parallelogram is a square.

3. A magnetic anomaly homing system as in claim 1 wherein said non-magnetic platform is an autonomous vehicle that uses said guidance control parameters in autonomous navigation thereof.

4. A magnetic anomaly homing system as in claim 1 wherein said two nonparallel axes comprise axes defined by peripheral edges of said array wherein each endpoint of each of said peripheral edges terminates at one of said four TM sensors.

5. A magnetic anomaly homing system as in claim 1 wherein a first axis of said two nonparallel axes comprises an axis defined by a peripheral edge of said array wherein each endpoint of said peripheral edge terminates at one of said four TM sensors, and wherein a second axis of said two nonparallel axes comprises a virtual axis that bisects said array with each said virtual axis terminating at a midpoint of said first axis and at a midpoint of a peripheral edge of said array that opposes and is parallel to said first axis.

6. A method of homing in on a magnetic anomaly, comprising the steps of:
   providing a planar array of four triaxial magnetometer (TM) sensors coupled to a non-magnetic platform, said four TM sensors positioned at the vertices of a rectangular parallelogram lying in a plane that is one of (i) parallel to a direction of motion of said platform and (ii) perpendicular to said direction of motion, each of said four TM sensors sensing a magnetic field thereat due to the presence of a magnetic anomaly, said magnetic field being sensed in terms of three mutually orthogonal dimensional components thereof;
   moving said platform with said array coupled thereto along said direction of motion;
   generating complete gradient tensors and corresponding scalar gradient contractions thereof for four two-axis gradiometers formed by said array using said magnetic field so-sensed at each of said four TM sensors, wherein said scalar gradient contractions for each of said four two-axis gradiometers use magnetic field data associated with endpoints of two nonparallel axes of said array, and wherein said scalar gradient contractions define guidance control parameters; and
   steering said platform using said guidance control parameters to align said direction of motion with the magnetic anomaly.

7. A method according to claim 6 wherein said rectangular parallelogram is a square.

8. A method according to claim 6 wherein said two nonparallel axes comprise axes defined by peripheral edges of said array wherein each endpoint of each of said peripheral edges terminates at one of said four TM sensors.

9. A method according to claim 6 wherein a first axis of said two nonparallel axes comprises an axis defined by a peripheral edge of said array wherein each endpoint of said peripheral edge terminates at one of said four TM sensors, and wherein a second axis of said two nonparallel axes comprises a virtual axis that bisects said array with each said virtual axis terminating at a midpoint of said first axis and at a midpoint of a peripheral edge of said array that opposes and is parallel to said first axis.

\* \* \* \* \*